(12) United States Patent  (10) Patent No.: US 7,515,709 B2
Richter  (45) Date of Patent: Apr. 7, 2009

(54) MODULAR APPARATUS HOLDER WITH MULTIPURPOSE INTERMEDIATE SUPPORT MEMBER FOR SUPPORTING MINICOMPUTERS, CELL PHONES AND SIMILAR APPARATUS

(76) Inventor: Harald Richter, Höhenstrasse 32, 75331 Engelbrand (DE)

( * ) Notice: Subject to any disclaimer, the term of this patent is extended or adjusted under 35 U.S.C. 154(b) by 776 days.

(21) Appl. No.: 11/064,000

(22) Filed: Feb. 15, 2005

(65) Prior Publication Data

US 2006/0089186 A1    Apr. 27, 2006

(30) Foreign Application Priority Data

Oct. 26, 2004    (DE)    ........................ 10 2004 052 160

(51) Int. Cl.
*H04M 1/00* (2006.01)
*H04M 9/00* (2006.01)

(52) U.S. Cl. ........................ 379/446; 379/455

(58) Field of Classification Search ............ 379/420.04, 379/426, 449, 454, 455, 429, 446; 455/575.9, 455/569.1, 569.2, 575.1; 248/158–160, 371, 248/121, 429, 917; 224/197
See application file for complete search history.

(56) References Cited

U.S. PATENT DOCUMENTS

| 4,850,006 | A | * | 7/1989 | Sasaki et al. | ................. 455/571 |
|---|---|---|---|---|---|
| 5,187,744 | A | * | 2/1993 | Richter | ........................ 379/449 |
| 5,535,274 | A | * | 7/1996 | Braitberg et al. | ............ 379/446 |
| 5,588,041 | A | * | 12/1996 | Meyer et al. | ............. 455/569.2 |
| 5,659,887 | A | * | 8/1997 | Ooe | ........................ 455/575.9 |
| 5,754,962 | A | * | 5/1998 | Griffin | ..................... 455/569.2 |
| 5,839,919 | A | * | 11/1998 | Chen | .......................... 439/529 |
| 6,028,930 | A | * | 2/2000 | Chen | .......................... 379/446 |
| D479,228 | S | * | 9/2003 | Sakaguchi et al. | ......... D14/253 |
| D480,719 | S | * | 10/2003 | Yuen | ......................... D14/253 |
| 6,687,513 | B1 | * | 2/2004 | Hsu Li | ....................... 455/557 |
| 7,068,783 | B2 | * | 6/2006 | Peiker | ........................ 379/446 |
| 7,092,521 | B2 | * | 8/2006 | Wang | ......................... 379/455 |
| 2004/0028219 | A1 | | 2/2004 | Lin | |
| 2004/0263417 | A1 | * | 12/2004 | Sanchez et al. | ............. 343/906 |
| 2008/0070641 | A1 | * | 3/2008 | Wang | ..................... 455/569.1 |

* cited by examiner

*Primary Examiner*—Curtis Kuntz
*Assistant Examiner*—Phylesha Dabney
(74) *Attorney, Agent, or Firm*—Klaus J. Bach

(57) ABSTRACT

In a modular holder for supporting an apparatus or instrument such as a minicomputer or a cell phone, comprising a support member with a support head and an apparatus holder supported thereby, an intermediate box is releasably mounted with one side thereof by an engagement structure onto the support head and the apparatus holder is releasably mounted by an identical engagement structure onto another side of the intermediate box and the intermediate box includes at least a loud-speaker for transmitting sound generated by an apparatus engaged by the apparatus holder.

7 Claims, 5 Drawing Sheets

MODULAR APPARATUS HOLDER WITH MULTIPURPOSE INTERMEDIATE SUPPORT MEMBER FOR SUPPORTING MINICOMPUTERS, CELL PHONES AND SIMILAR APPARATUS

BACKGROUND OF THE INVENTION

Minicomputers in pocket format, generally designated as PDA (Personal Digital Assistant), mobile navigation apparatus, cell phones and combinations of such apparatus are often used in motor vehicles. To facilitate their use in motor vehicles apparatus holders are known which include means for attaching the apparatus holder to the windshield, the dashboard or another suitable location of the motor vehicle. The apparatus holders also include often an adjustable support arm, for example, in the form of a so-called goose neck, and an apparatus support device for engaging and supporting the respective apparatus. It is also known to mount the apparatus support device on the support arm in a removable manner so that it can be replaced by another apparatus support device designed specifically for supporting another instrument or apparatus.

The use of such apparatus in a motor vehicle in connection with the support device described is advantageous in many respects since they are supported so as to be conveniently positioned relative to a vehicle driver and can easily be removed and carried along by the user, but there are some points which are not satisfactory when using the instruments or apparatus supported on such holders in a motor vehicle. For example, the acoustic reproduction of messages of a mobile navigation apparatus is difficult to understand when generated by the small loudspeakers of the apparatus as the driving, the wind, and the traffic noises are often overwhelming. Also, the cables needed in connection with such apparatus are often distracting for example when a GPS antenna is to be mounted on the windshield out of the field of sight of the driver or another suitable location and connected to the instrument via a cable which may loosely run through the passenger compartment and disturb the driver or passenger of the motor vehicle.

It is the object of the present invention to provide an improved apparatus or instrument holder which renders the use of such an apparatus or instrument in connection with a holder in a vehicle more convenient and more efficient.

SUMMARY OF THE INVENTION

In a modular support device for supporting an apparatus or instrument such as a minicomputer or a cell phone, comprising a support member with a support head or an apparatus holder supported thereby, an intermediate box is releasably mounted with one side thereof by an engagement structure onto the support head and the apparatus holder is releasably mounted by an identical engagement structure onto another side of the intermediate box and the intermediate box includes at least a loudspeaker for transmitting sound generated by an apparatus engaged by the apparatus holder.

The modular apparatus or instrument holder according to the invention comprises a device which is mounted to the vehicle at a suitable location such as the windshield, the dashboard or the center console and which includes a mounting foot, a support arm extending from the mounting foot and carrying a support device for holding and engaging the respective apparatus or instrument such that it can be easily removed from, and again deposited on, the support device. Between the support arm and the support device, a multipurpose intermediate mounting box is provided which particularly includes at least one loudspeaker and an amplifier for amplifying the acoustic messages of the apparatus or instrument disposed on the holder and transmit them with good sound quality and volume. For adjusting the volume, the box may include a volume control. Between the back of the box and the front of the support arm head, a space is provided by an appropriate configuration of the connecting structure so that sound waves can be emitted from sound exit openings on the backside of the box. A sound signal input receptacle at the side of the box is provided for plugging in a (audio output) cable of the apparatus or instrument supported on the holder.

Preferably, several functions are provided by the box. Particularly, the box may also serve as power supply or power transmission device for supplying power to the apparatus or instruments supported on the holder. To this end, it is provided with a receptacle which, by way of a cable, can be connected to a power supply plug or receptacle of the motor vehicle, for example, the cigarette lighter receptacle. Furthermore, the box may serve as an antenna device for plugging in a GPS antenna. The GPS antenna preferably includes an antenna socket on which the antenna is pivotally supported and which itself is firmly connected to a plug for insertion into the antenna receptacle of the box. The navigation apparatus is connected to a second antenna receptacle of the box by way of an antenna cable.

The invention will become more readily apparent from the following description of an embodiment thereof on the basis of the accompanying drawings.

BRIEF DESCRIPTION OF THE DRAWINGS

FIG. 4 is another side view of the intermediate box with the antenna module plugged in, FIG. 5 is a front view of the intermediate box with the antenna module plugged in, FIG. 7 is a top view of the intermediate box with the antenna module plugged in, and FIG. 8 is a bottom view of the intermediate box with the antenna module plugged in.

DESCRIPTION OF A PARTICULAR EMBODIMENT

The drawings are schematic drawings to show the setup of the arrangement according to the invention with the essential features without unnecessary details.

Figure 1:
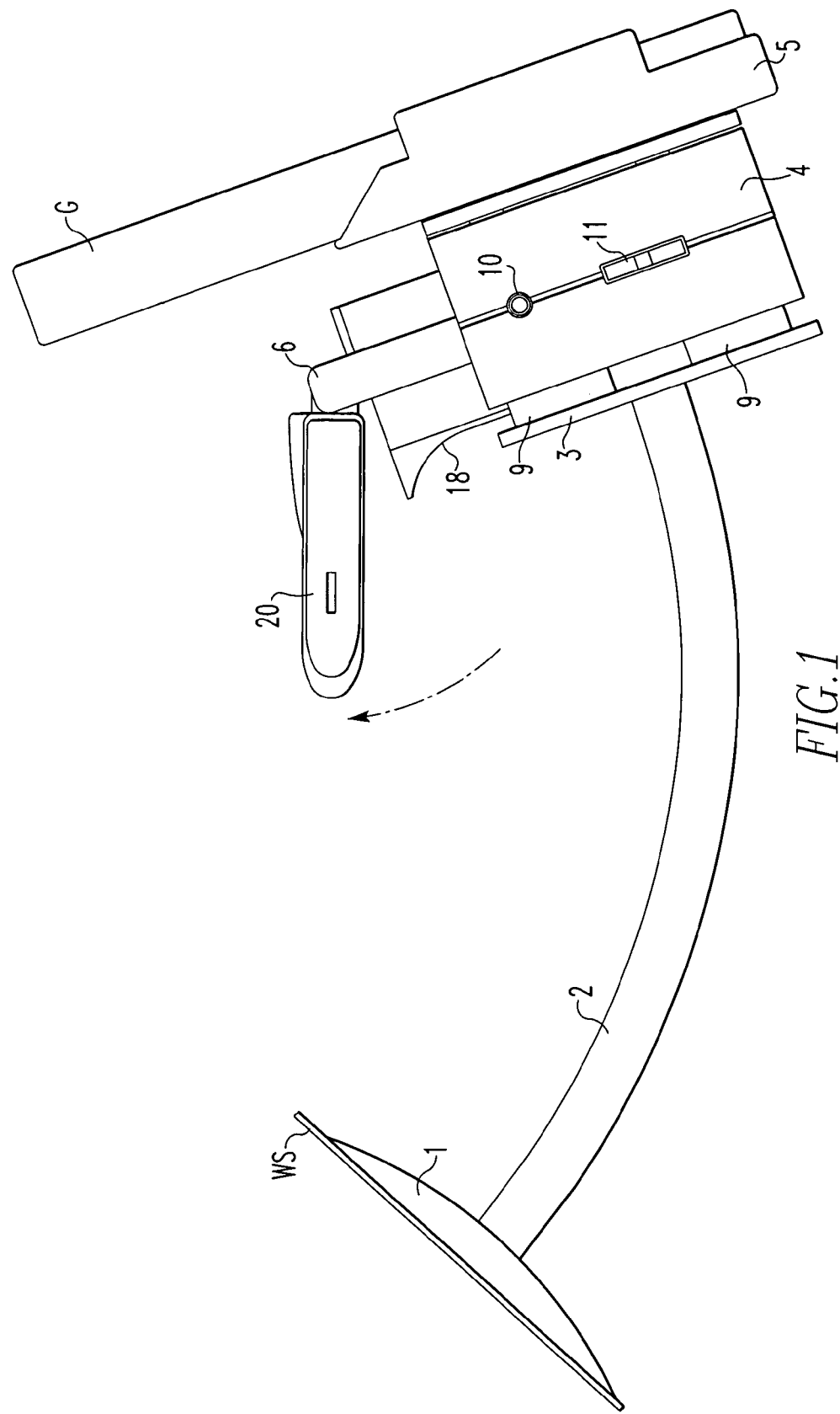
FIG. 1 is a side view of the apparatus holder according to the invention with an apparatus or instrument including a GPS antenna module supported on the holder, wherein however the outer connecting cables have been omitted.

FIG. 1 is a complete modular apparatus or instrument holder according to the invention with an instrument supported thereon and a GPS antenna plugged into the instrument holder.

The modular apparatus or instrument holder comprises a support arm module with a mounting foot 1 in the form of a suction device by means of which the support module is attached for example to the windshield WS of a motor vehicle via a bendable, flexible support arm 2 at the free end of which a support head 3 in the form of a mounting plate is arranged.

Of course, the support arm module may be of a different design: it may include for example a rigid column disposed on a mounting foot and carrying at its free end a head in the form of a mounting plate. Such support arm modules are known for various conventional holders.

In the modular apparatus or instrument holder according to the invention, an intermediate box 4 is mounted onto the support arm head 3 which intermediate box 4 will be described below in greater detail. An apparatus or instrument holder 5 is mounted onto the intermediate box 4. The instrument holder 5 is specifically designed for the reception of a particular instrument G and is therefore configured in accordance with the shape of the particular instrument or apparatus which it is to receive and engage.

In conventional apparatus or instrument holders which are removable, the instrument holder is mounted directly onto the support head 3. In the arrangement according to the invention, the multipurpose intermediate box 4 is disposed between the support arm head 3 and the apparatus holder 5. In the embodiment shown also, a GPS antenna module 6 is plugged into the intermediate box 6.

The intermediate box 4, shown in FIGS. 2 to 8 from all sides, is in the present example an active loudspeaker box, a power supply device and an antenna structure.

The support arm head 3, the intermediate box 4 and the apparatus holder 5 all consist preferably of a plastic material and are interconnected by rapid coupling mechanisms. The rapid coupling mechanisms comprise a number of preferably hook-like projections 7 with L-shaped cross-sections on one part and complementary slots 8 formed in the other part for engagement with the one part: the hook-like projections 7 are inserted into the complementary slots 8 and the one part is then moved laterally slightly with respect to the other whereby the two parts are firmly engaged with one another. Such an engagement structure is disclosed in U.S. Pat. No. 5,740,995. The rapid coupling structures between the apparatus holder 5 and the intermediate box 4 and between the intermediate box 4 and the support arm head 3 are preferably identical with regard to their arrangement dimensioning and orientation and also the same as used in other apparatus holders so that they are usable interchangeably and the intermediate box is usable also in connection with other holders or the instrument holders can be mounted onto the support head directly without the intermediate box.

Figure 2:
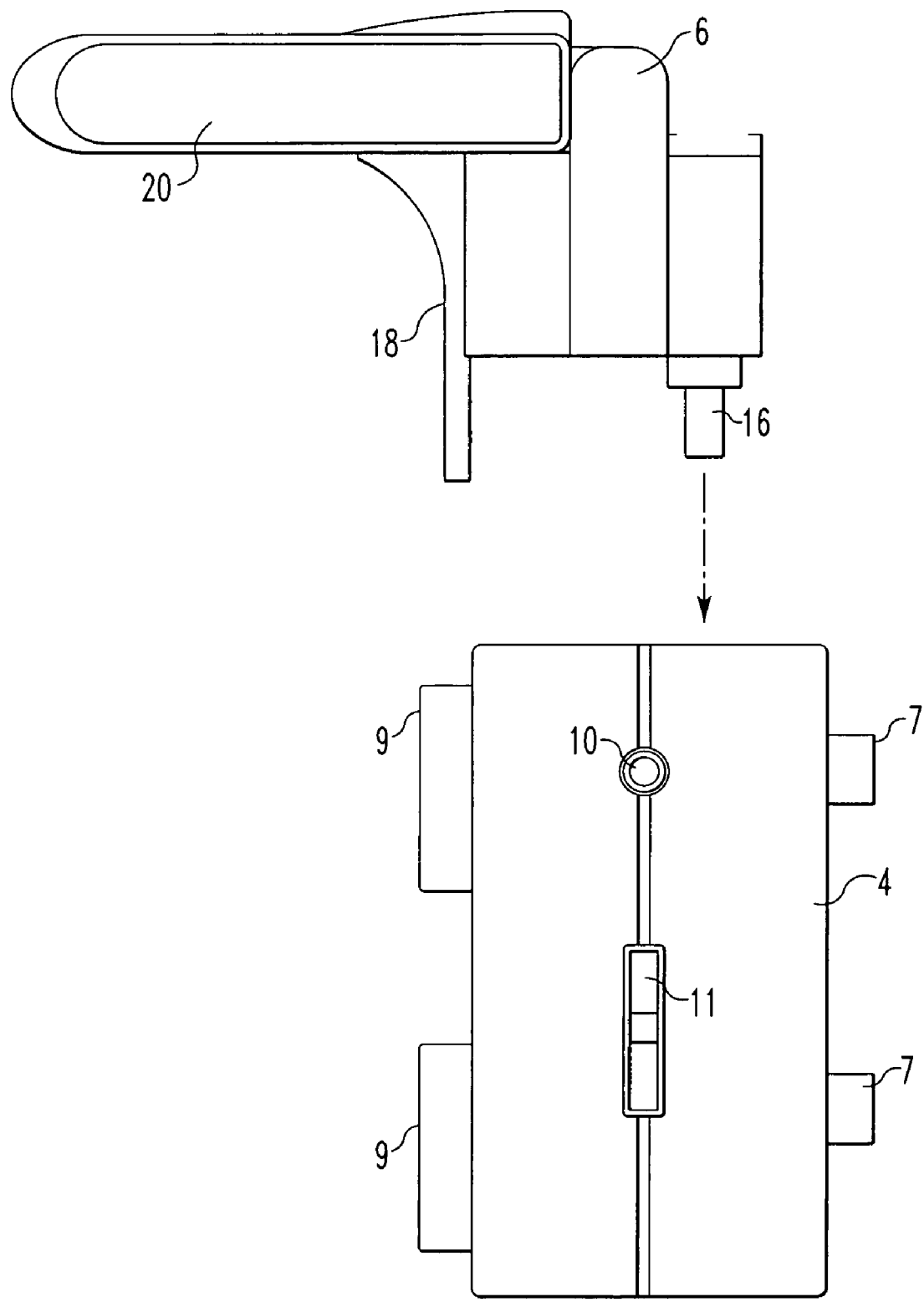
FIG. 2 shows, in an exploded view, the intermediate box and the GPS antenna module in a side view.

As shown in the side view of FIG. 2, the hook-like projections 7 are provided on the front side and the insertion slots 8 (not visible in FIG. 2) are provided on the projecting legs 9 on the backside of the intermediate box 4. On the side of the intermediate box 4 visible in FIG. 2, an audio signal input terminal 10 and a volume control 11 are arranged.

Figure 3:
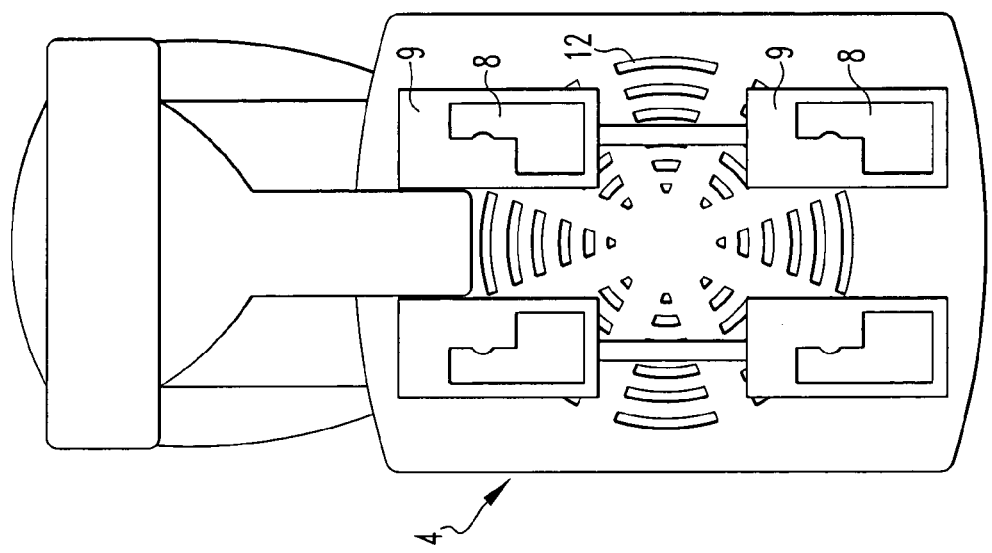
FIG. 3 is a rear end view of the intermediate box with antenna module plugged into the box.

FIG. 3 shows the backside of the intermediate box 4 with the legs 9 and the slots 8 formed therein for receiving the hook-like projections of the support arm head 3. Furthermore, the intermediate box 4 is provided on the backside with sound slots 12 for the sound waves generated by a loudspeaker installed in the box 4. The legs 9 provide for a gap between the car wall of the box 4 and the support arm head 3 so that the sound waves can exit through the sound slots 12 and are reflected by the mounting plate of the support arm head 3 into the surrounding area. Of course, the sound slots 12 may be arranged at the front side of the intermediate box 4 and a gap for the sound waves may then be provided between the front side of the sound box and the apparatus or instrument holder 5. It is noted however that the arrangement with the sound slots at the back side of the intermediate box 4 has been found to be more expedient. Of course, sound exit openings may also be provided in the side walls of the intermediate box. A practical arrangement will depend on what functions altogether will be incorporated into the intermediate box 4 and on space considerations. The side surfaces of the intermediate box 4 however are expediently used for the installation of the necessary plug sockets as will be apparent from the description below.

Figure 4:
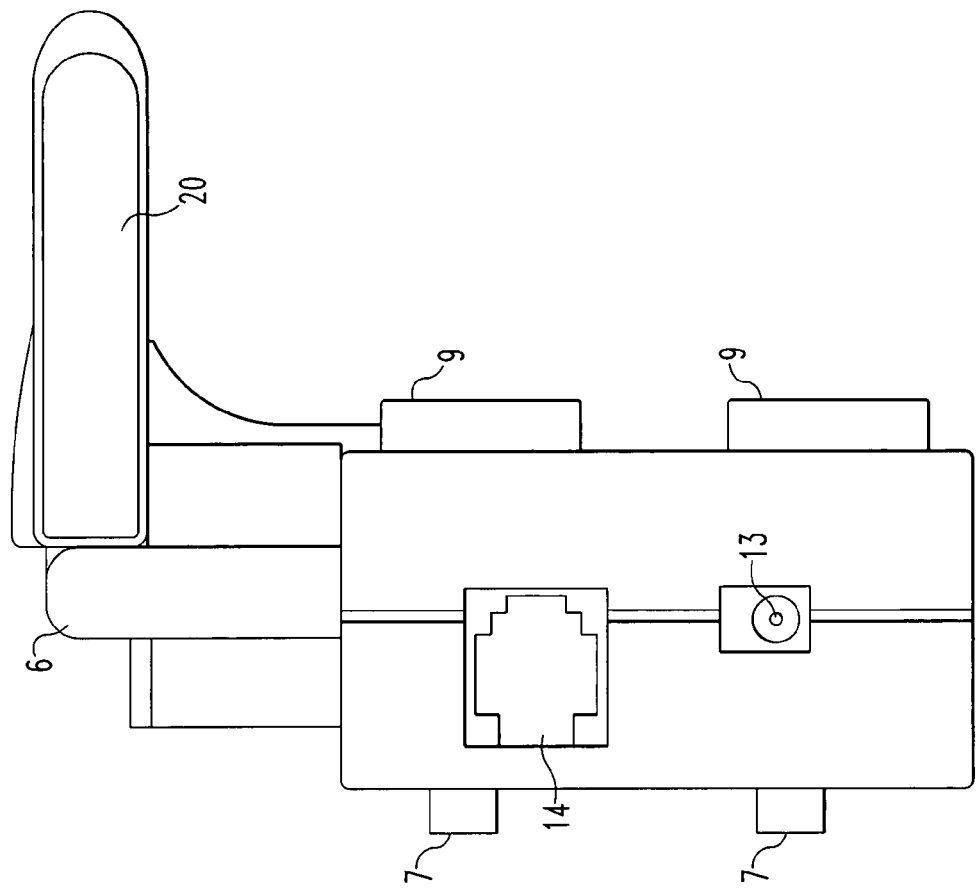

FIG. 4 shows the intermediate box 4 from the side opposite that shown in FIG. 2. At this side, a power input plug socket 13 and GPS antenna input signal plug socket 14 are provided. Into the plug socket 13, the plug of a power supply cable can be inserted whose other end has a plug fitting into the cigarette lighter socket of the vehicle. Into the GPS antenna input socket 14, a GPS antenna cable plug can be inserted of a GPS antenna mounted for example on the windshield or on the dashboard of the vehicle.

Figure 5:
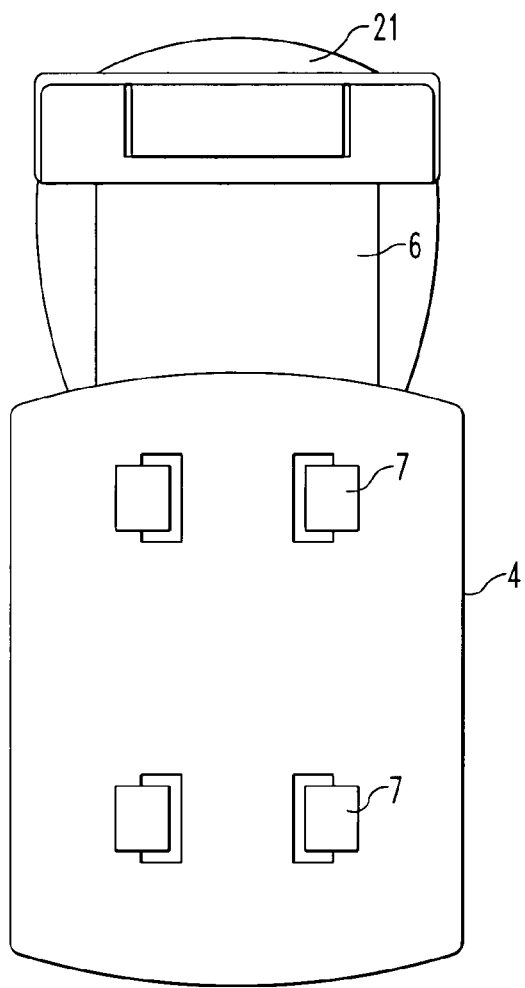

FIG. 5 shows the front side of the intermediate box 4 with the hook-like projections 7 extending therefrom for reception in the respective slots in the back walls of the apparatus or instrument holder 5.

Figure 6:
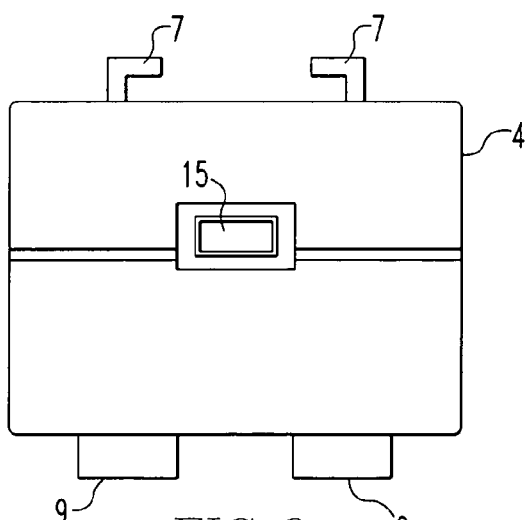
FIG. 6 is a top view of the intermediate box with the antenna module removed.

FIG. 6 shows the intermediate box 4 in a top view wherein the legs 9 at the rear side and the hook-like projections 7 at the front side are clearly visible. At the top side, an antenna plug-in socket 15 is provided in the form of a mini-USB socket 15 into which a corresponding mini-USB plug 16 projecting from the GPS antenna module 6 is inserted when the GPS antenna module 6 is placed in position on top of the intermediate box 4. The antenna module is shown in all figures except in FIG. 6 in order to be able to show the USB socket 15.

Figure 7:
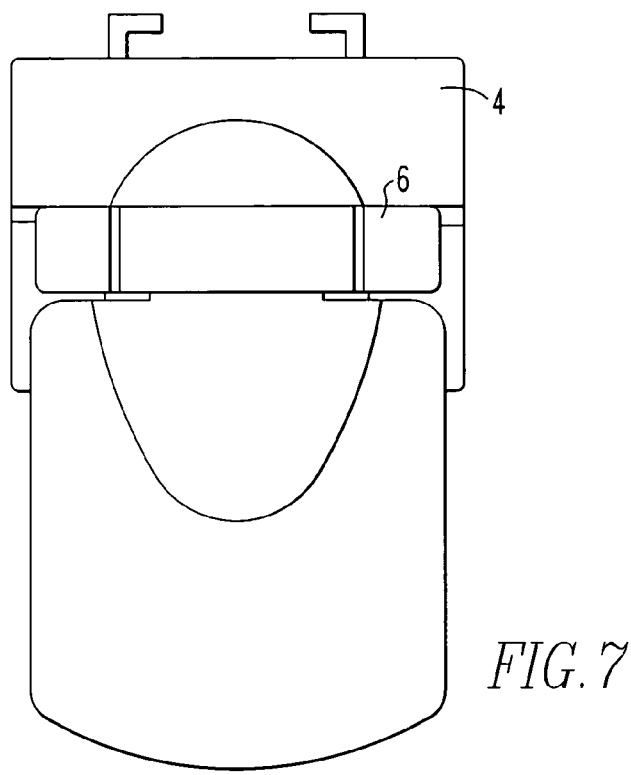

FIG. 7 is a top view similar to FIG. 6 showing the GPS antenna module 6 plugged into the intermediate box 4.

Figure 8:
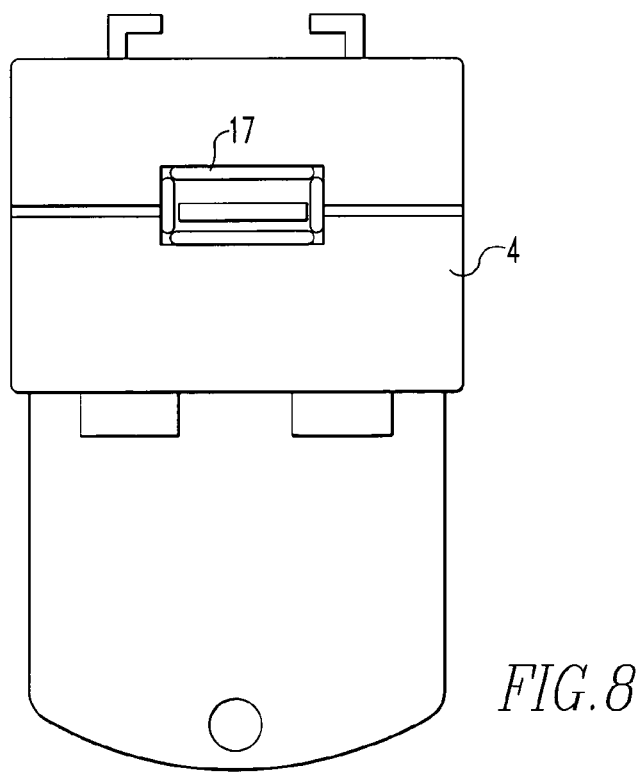

FIG. 8 is a bottom view of the intermediate box 4 with a GPS antenna module 6 plugged into the intermediate box 4. At the underside of the intermediate box 4, a charging/data socket 17 is arranged into which a corresponding plug of a charging/data cable of the apparatus or instrument G can be inserted. By way of the charging/data socket 17, the apparatus or instrument G obtains from the intermediate box 4 firstly electric power for the operation of the apparatus or instrument G, that is, for charging the batteries thereof and secondly GPS antenna data. These data may be provided by the antenna module 6 plugged into the intermediate box 4 or from another GPS antenna mounted remote from the intermediate box 4 and connected thereto via an antenna cable plugged into the antenna input socket 14 arranged at one side of the intermediate box 4.

As already mentioned, the intermediate box 4 includes a loudspeaker as indicated in FIG. 3 by the circular loudspeaker sound openings 12 and also an amplifier which can be controlled by the volume controller 10 arranged at a side of the intermediate box 4. Power is supplied to the amplifier by way of the power input plug socket 13.

Furthermore, the intermediate box 4 is in the embodiment shown also a power supply device, which, via the power supply plug socket 13, supplies electrical power received from a vehicle electric power outlet via the power input plug socket 13 at the required voltage to the respective apparatus or instrument G and to the amplifier for controlling the sound volume.

As already pointed out, the intermediate box 4 may be connected to an antenna structure, which may simply be plugged as GPS antenna module directly into the intermediate box 4 or provide for the connection of a GPS antenna arranged elsewhere in the motor vehicle. By means of the power supply included in the intermediate box 4 also the respective GPS antenna can be supplied with electric power and the data signals supplied by the antenna can be supplied by a corresponding data line within the intermediate box to the output socket 17.

The described functions are of course to be considered to be exemplary. The intermediate box according to the invention may accommodate fewer functions than those described or it may have additional functions depending on the type and the requirements of the apparatus or instrument G.

The GPS antenna module 6 shown in FIG. 2 separated from the intermediate box 4 and in FIGS. 3-7 and 8 plugged into the intermediate box 4 includes a socket 18 on which the mini-USB plug 16 is firmly mounted. On this socket 18, an antenna carrier 19 is rotatably supported and carries an antenna element 20 by way of a hinge structure 21. The antenna element 20 can in this way be adjusted on the socket 18 as to its inclination and its rotational orientation for optimizing the reception.

What is claimed is:

1. A modular apparatus holder for supporting minicomputers, cell phones and similar apparatus, comprising a support member (2) with a support head (3) an intermediate box (4) releasably mounted with one side thereof by a first engagement structure (8, 7) onto the support head (3) and an apparatus holder (5) releasably mounted by a second engagement structure (8, 7) onto another side of the intermediate box (4), said intermediate box including at least a loudspeaker for transmitting sound generated by an apparatus engaged by the apparatus holder, the second engagement structure being identical with the first engagement structure, so that the apparatus holder (5) can be mounted selectively onto the intermediate box or directly onto the support head (3).

2. A modular apparatus holder according to claim 1, wherein the intermediate box 4 includes an electric power input socket (13) for supplying electric power thereto and an electric power output socket (17) for supplying electric power to an apparatus supported on the apparatus holder (5).

3. A modular apparatus holder according to claim 1, wherein the bottom side of the intermediate box (4) includes openings for transmitting the sound of a speaker disposed within the intermediate box and the underside of the intermediate box includes legs (9) on which the engagement structure is provided so as to support the intermediate box (4) in spaced relationship from the support head (3).

4. A modular apparatus support device according to claim 1, wherein the intermediate, box (4) includes sound volume control means (11) for adjusting the volume of the sound provided by the speaker arranged in the intermediate box (4).

5. A modular apparatus support device according to claim 1, wherein an antenna module (6) with a USB plug (16) is removably mounted onto the intermediate box (4) and the intermediate box (4) includes a USB socket (15) for receiving the USB plug (16) of the antenna module (6).

6. A modular apparatus support device according to claim 4, wherein the antenna module (6) includes an antenna (20) which is rotatably and pivotally supported to permit positioning of the antenna for optimum reception.

7. A modular apparatus support device according to claim 1, wherein the engagement structure includes hook-shaped projections in one of the parts to be interconnected and slot-shaped openings in the other part for receiving the hook-shaped projections.

\* \* \* \* \*